(12) United States Patent
He et al.

(10) Patent No.: US 11,089,143 B2
(45) Date of Patent: Aug. 10, 2021

(54) TERMINAL DEVICE, AUDIO PROCESSING METHOD AND DEVICE

(71) Applicant: BEIJING XIAOMI MOBILE SOFTWARE CO., LTD., Beijing (CN)

(72) Inventors: Jingsong He, Beijing (CN); Jing Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/738,909

(22) Filed: Jan. 9, 2020

(65) Prior Publication Data

US 2021/0099561 A1 Apr. 1, 2021

(30) Foreign Application Priority Data

Sep. 30, 2019 (CN) .......................... 201910941408.1

(51) Int. Cl.
  *H04M 1/03* (2006.01)
  *H04R 5/04* (2006.01)

(52) U.S. Cl.
  CPC .............. *H04M 1/035* (2013.01); *H04R 5/04* (2013.01)

(58) Field of Classification Search
  CPC ................................ H04M 1/035; H04R 5/04
  See application file for complete search history.

(56) References Cited

U.S. PATENT DOCUMENTS 10,419,834 B2 * 9/2019 Rittenhouse ............. H04R 1/02
10,491,987 B2 * 11/2019 Huh .................... H04M 1/0202
2011/0129109 A1 * 6/2011 Okutsu .................. H04R 1/025
  381/332
2013/0170124 A1 7/2013 Pan et al.
2013/0215041 A1 8/2013 Kim et al.
2014/0341420 A1 11/2014 Karkkainen et al.
2015/0178101 A1 * 6/2015 Krishnaswamy ... G06F 9/44505
  713/100
2017/0230751 A1 8/2017 Yu et al.
2019/0335255 A1 10/2019 Karkkainen et al.
2020/0153952 A1 5/2020 Liu et al.

FOREIGN PATENT DOCUMENTS

GB       2491366 A    12/2012
WO    2019019420 A1    1/2019

OTHER PUBLICATIONS

Extended European Search Report in the European application No. 20152679.5, dated Jul. 28, 2020, (12p).

* cited by examiner

*Primary Examiner* — Andrew L Sniezek
(74) *Attorney, Agent, or Firm* — Arch & Lake LLP

(57) ABSTRACT

Provided is a terminal device, an audio processing method, and a storage medium. The terminal device at least comprises: a housing, which has a flexible structure and is configured to bent at the flexible structure; an audio cavity component located within the housing and is configured to deform along with the deformation of the housing to form a corresponding deformation state; and a processing component, which is configured to determine, based on the deformation state of the audio cavity component, an audio processing parameter matching the deformation state of the audio cavity component.

17 Claims, 6 Drawing Sheets

TERMINAL DEVICE, AUDIO PROCESSING METHOD AND DEVICE

CROSS-REFERENCE TO RELATED APPLICATIONS

The present application is based upon and claims priority to Chinese Patent Application No. 201910941408.1, filed on Sep. 30, 2019, the entire contents of which are incorporated herein by reference.

BACKGROUND

With the emergence of flexible and foldable terminal devices, there are currently various types of terminal devices, such as a terminal device folded inward, a terminal device folded outward, a single-folded terminal device and a multi-folded terminal device. However, the existing audio cavity component of the terminal device is not applied to the foldable terminal device.

SUMMARY

The present disclosure relates to the technical field of electronic devices, and more particularly, to a terminal device, an audio processing method, and a storage medium.

The present disclosure provides a terminal device, an audio processing method, and a storage medium.

According a first aspect of the present disclosure, provided is a terminal device comprising: a housing having a flexible structure, wherein the housing is configured to bend at the flexible structure; an audio cavity component located within the housing, wherein the audio cavity component includes a deformation state corresponding to a deformation of the housing occurred at the flexible structure; a processing component configured to determine, based on the deformation state of the audio cavity component, an audio processing parameter corresponding to the deformation state of the audio cavity component.

According to a second aspect of the present disclosure, provided is an audio processing method which may apply to the terminal device mentioned above. The method comprises: determining a deformation state of an audio cavity component, wherein the deformation state of the audio cavity component is generated by the deformation of the audio cavity component corresponding to the deformation of a housing at a flexible structure of the housing, and wherein the terminal device comprises the housing having the flexible structure and configured to bend at the flexible structure, and the audio cavity component is located within the housing; determining, based on the deformation state of the audio cavity component, an audio processing parameter corresponding to the deformation state of the audio cavity component; and performing, based on the audio processing parameter, audio processing on an audio signal to be output.

According a third aspect of the present disclosure, provided is a non-transitory computer readable storage medium storing a plurality of programs for execution by a terminal device comprising one or more processors, wherein the plurality of programs, when executed by the one or more processors, cause the terminal device to perform acts comprising: determining a deformation state of an audio cavity component, wherein the deformation state of the audio cavity component is generated by a deformation of the audio cavity component corresponding to a deformation of a housing at a flexible structure of the housing, and wherein the terminal device comprises the housing having the flexible structure and configured to bend at the flexible structure, and the audio cavity component is located within the housing; determining, based on the deformation state of the audio cavity component, an audio processing parameter corresponding to the deformation state of the audio cavity component; and performing, based on the audio processing parameter, audio processing on an audio signal to be output.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

Figure 1:
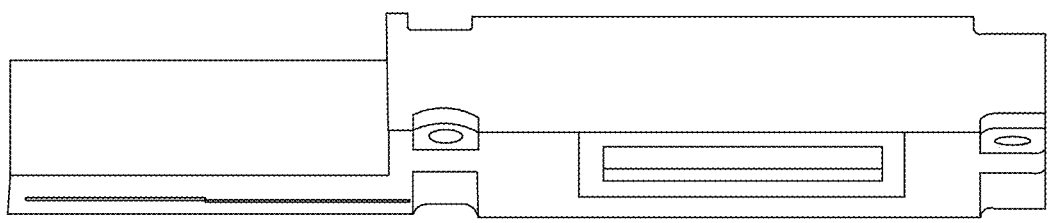
FIG. 1 is a structure diagram of an audio cavity component in a related art.

In the related art, an audio cavity component of a terminal device is shown in FIG. 1. The audio cavity component is fixed on the terminal device, and both a structure form and a corresponding audio processing parameter of the audio cavity component are unchanged. However, the fixed audio cavity component and the corresponding audio processing parameter are not applied to a foldable terminal device.

Figure 2:
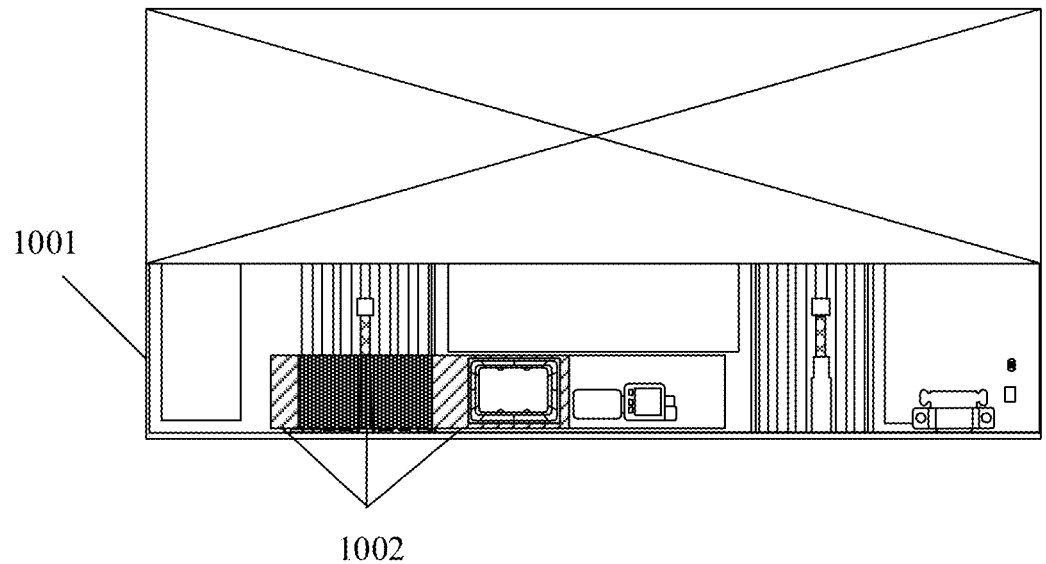
FIG. 2 is a first structure diagram of a terminal device, according to an example.

Based on this, the embodiments of the present disclosure present a terminal device. FIG. 2 is a first structure diagram of a terminal device, according to an example. As shown in FIG. 2, the terminal device may include:

a housing 1001, having a flexible structure, wherein the housing is configured to bend at the flexible structure;

an audio cavity component 1002 located within the housing, and being able to form a corresponding deformation state along with a deformation, occurring at the flexible structure, of the housing; and a processing component configured to determine, based on the deformation state of the audio cavity component, an audio processing parameter matching the deformation state of the audio cavity component.

In the embodiments of the present disclosure, the terminal device includes a housing, an audio cavity component, and a processing component.

For example, the terminal device may be a wearable electronic device and a mobile terminal. The mobile terminal may include a mobile phone, a laptop and a tablet PC, and the wearable electronic device may include a smart watch, which is not limited by the embodiments of the present disclosure.

It is to be noted that the shape, size and color of the housing may be set according to users' needs and use habits.

For example, the shape of the housing may be set to rectangle, the size of the housing may be set to 7.2 inches, and the color may be set to black, which is not limited by the embodiments of the present disclosure.

In the embodiments of the present disclosure, the housing can bend at a flexible structure.

For example, the flexible structure includes, but not limited to, a flexible screen. The flexible screen is a bendable or foldable screen.

In the embodiments of the present disclosure, the audio cavity component is a bendable or foldable flexible component, and can deform at the flexible structure along with the housing.

It is to be noted that an acoustic wave generated as an audio output component plays an audio signal is propagated outward via the audio cavity component. The audio cavity component can enable the audio output component to output a better audio effect, thereby meeting an acoustic performance requirement.

In an embodiment, at least a part of the audio cavity component 1002 is a component formed by a deforming structure.

In the embodiments of the present disclosure, the audio cavity component has different deformation states based on deforming.

For example, the deformation states of the audio cavity component include, but not limited to, an unbent state, an intermediate folding state and a complete folding state. The unbent state of the audio cavity component indicates that the audio cavity component is in an unfolded state.

In the embodiments of the present disclosure, the processing component can determine, based on the deformation state of the audio cavity component, the audio processing parameter matching the deformation state of the audio cavity component.

It is to be noted that the audio cavity space of the audio cavity component is different under different deformation states. That is, the audio cavity space of the audio cavity component dynamically changes in the bending process, but the change of the audio cavity space will cause the processing of the acoustic wave (such as the processing of the refraction, the reflection of the acoustic wave) in the audio cavity to change correspondingly. If the same audio processing parameter is still used to process the audio signal during the process of the audio cavity space of the audio cavity component dynamically changes, obviously it is difficult to ensure the best audio output effect. Therefore, in consideration of the impact of the change of the audio cavity space on the output audio effect, the embodiments of the present disclosure puts forward that it is needed to select, based on the deformation state of the audio cavity component, the audio processing parameter matching the corresponding deformation state to ensure the best audio output effect.

For example, the audio processing parameters include: at least one of a gain parameter or a filtering parameter of the audio signal, which is not limited by the embodiments of the present disclosure.

It is to be noted that the gain of the audio signal may be amplified or reduced through the gain parameter, thereby impacting the loudness of acoustic wave after an audio is output. The frequency of the audio signal may be adjusted through the filtering parameter, thereby impacting the tone after the audio is output.

It is understandable that the audio cavity component of the embodiments of the present disclosure can deform along with a deformation, occurring at the flexible structure, of the housing, which is adapted to a requirement for a foldable performance of the terminal device. In addition, in consideration of the audio cavity space of the audio cavity component changes during the bending process in the embodiments of the present disclosure, the corresponding audio processing parameter can be determined based on the deformation state of the audio cavity component, so that the audio processing parameter can match the current deformation state of the audio cavity component, and thus a better audio effect can be output.

Figure 3A:
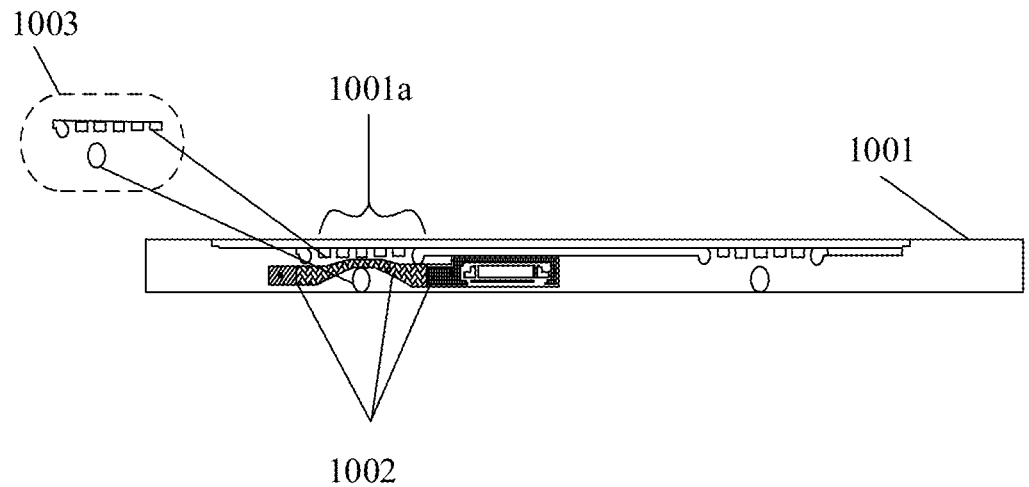
FIG. 3A is a second structure diagram of a terminal device, according to an example.

In an embodiment, as shown in FIG. 3a, the terminal device may further include:

a rotation shaft 1003, located within the housing. When an external force is applied onto the rotation shaft via the housing, the rotation shaft rotates and drives the housing to bend at the flexible structure 1001a; and an audio cavity component 1002, which generates the corresponding deformation state along with the rotation of the rotation shaft when the housing bends.

Figure 3B:
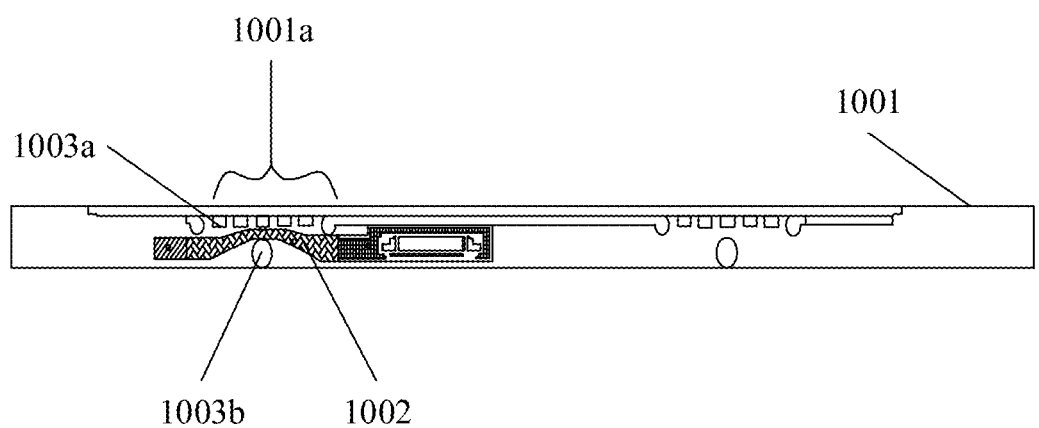
FIG. 3B is a third structure diagram of a terminal device, according to an example.

In an embodiment, as shown in FIG. 3b, the rotation shaft may include a support bar 1003a and a center rod 1003b. The support bar 1003a is mounted on the side, facing the audio cavity component 1002, of the flexible structure 1001a, and the center rod 1003b is mounted on the side, facing the audio cavity component 1002, of the housing.

It is to be noted that when a target object is applied onto the flexible structure, the support bar is used for supporting the flexible structure; and when an external force is applied onto the center rod via the housing, the center rod rotates. during the rotation of the center rod, the center rod drives the support bar and the flexible structure on the support bar to bend.

It is understandable that the cooperation between the support bar and the center rod can drive the audio cavity component to deform at a position of the center rod, so as to form the different deformation states.

In an embodiment, the audio cavity component may include a first audio cavity, a second audio cavity, and a third audio cavity. At least one of the first audio cavity, the second audio cavity, or the third audio cavity is deformable, and the first audio cavity, the second audio cavity, and the third audio cavity are interconnected.

It is to be noted that because the three audio cavities are interconnected, the deformation of one of three audio cavities will cause the change of the audio cavity space. In addition, because effects of processing the audio signal before the audio cavity space changes and after the audio cavity space changes are different, the embodiments of the present disclosure can adjust adaptively the audio processing parameter according to the deformation state, thereby reducing the phenomenon of bad audio effect which is caused by the change of the audio cavity space, and ensuring the audio output effect.

Figure 4:
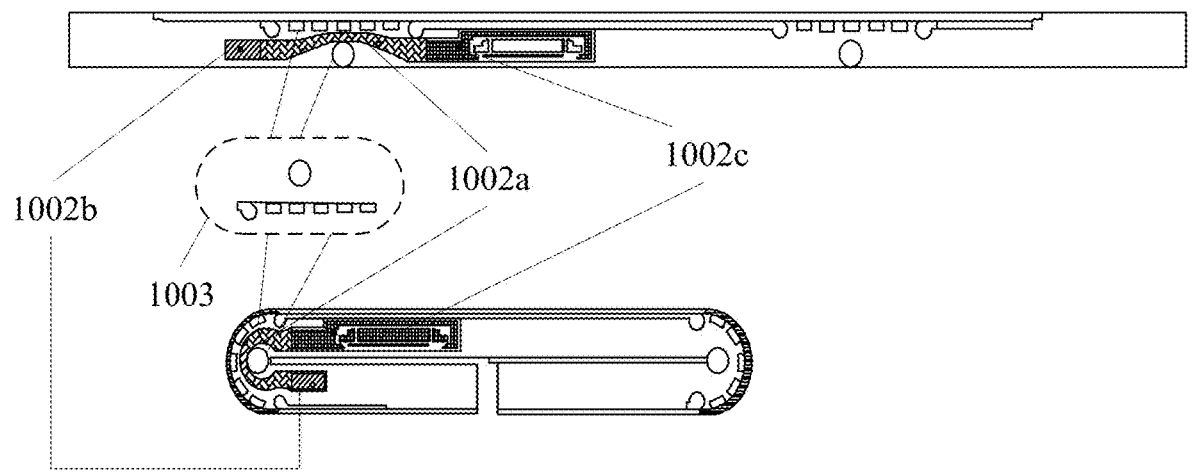
FIG. 4 is a fourth structure diagram of a terminal device, according to an example.
Figure 5:
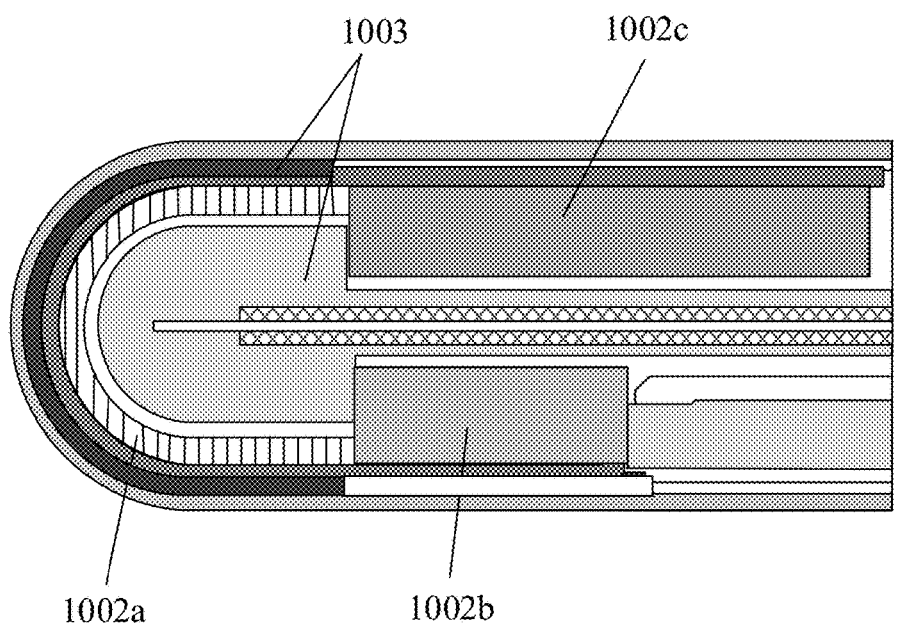
FIG. 5 is a fifth structure diagram of a terminal device, according to an example.

In an embodiment, as shown in FIG. 4 and FIG. 5, the audio cavity component may include:

a first audio cavity 1002a with a deformable structure and arranged at the side, facing the inside of the housing, of the rotation shaft; when the rotation shaft rotates by a first rotation angle, the first audio cavity is in a first deformation state; when the rotation shaft rotates by a second rotation angle, the first audio cavity is in a second deformation state; and when a rotation angle of the rotation shaft is between the first rotation angle and the second rotation angle, the first audio cavity is in a third deformation state;

a second audio cavity 1002b connected to the first audio cavity; and a third audio cavity 1002c connected to the first audio cavity. When no deformation of the first audio cavity occurs, the second audio cavity and the third audio cavity are located on both sides of the first audio cavity.

In the embodiments of the present disclosure, the deforming structure of the first audio cavity is made of a flexible material, and the first audio cavity can deform according to the rotation of the rotation shaft. That is, when the rotation shaft rotates different angles, the first audio cavity is in different deformation states.

It is to be noted that the rotation angle of the rotation shaft is, but not limited to, between 0 degree and 180 degrees. The deformation states of the first audio cavity include, but not limited to, the unbent state, the intermediate folding state and the complete folding state.

When the first rotation angle is 0 degree, the corresponding first deformation state of the first audio cavity may be the unbent state; when the first rotation angle is greater than 0 degree and less than 180 degrees, the corresponding third deformation state of the first audio cavity may be the intermediate folding state; and when the first rotation angle is 180 degrees, the corresponding second deformation state of the first audio cavity may be the complete folding state.

Figure 6:
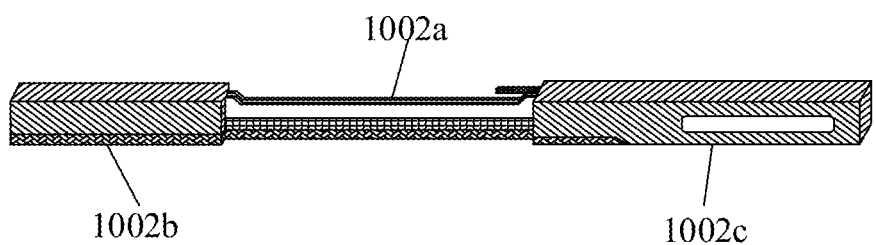
FIG. 6 is a first schematic diagram illustrating the bending of an audio cavity component, according to an example.

As shown in FIG. 6, when the rotation angle of the rotation shaft is 0 degree, the first audio cavity, the second audio cavity and the third audio cavity are on a same horizontal plane. At this point, the first audio cavity is in the unbent state.

Figure 7:
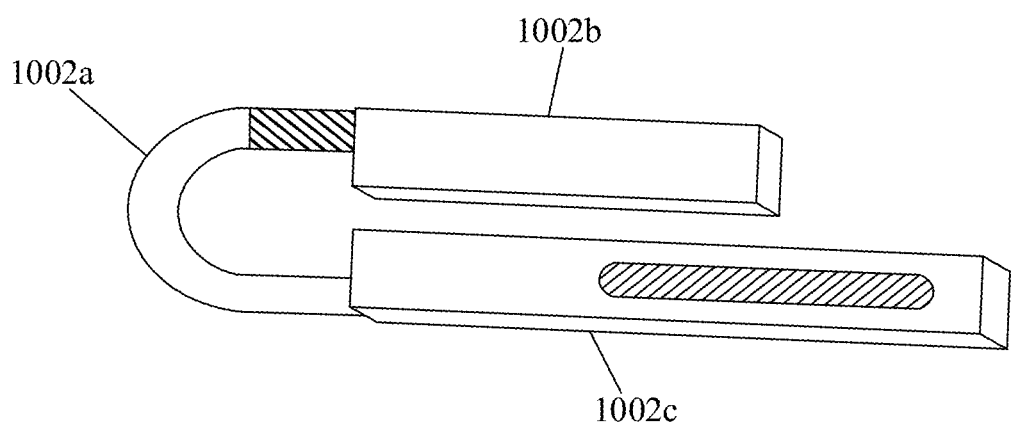
FIG. 7 is a second structure diagram illustrating the bending of an audio cavity component, according to an example.

As shown in FIG. 7, when the rotation angle of the rotation shaft is 180 degree, the first audio cavity bends 180 degrees, and the first audio cavity is in the complete folding state.

In the embodiments of the present disclosure, the two sides of the first audio cavity are respectively connected to the second audio cavity and the third audio cavity, to form a connected space.

It is to be noted that a cross-section shape of the first audio cavity may be set according to a design requirement and is limited to a geometrical shape.

For example, the shape of the first audio cavity includes, but not limited to, a pipe shape.

It is understandable that in the embodiments of the present disclosure, the audio cavity space of the audio cavity component is composed of connected spaces formed by the first audio cavity, the second audio cavity and the third audio cavity, and processing the audio signal via the formed connected space can increase the volume of the audio cavity space, so that there is enough audio cavity space for processing the audio to be output, and thus a better audio effect may be achieved.

In an embodiment, the second audio cavity has a first opening, and the third audio cavity has a second opening. The first audio cavity is made of the flexible material and formed on a side of the first opening and on a side of the second opening by an injection molding, and an injection molded sealing is formed for the first opening and the second opening.

It is to be noted that the flexible material includes, but not limited to, silica gel or Polyethylene (PE). The injection molding process includes, but not limited to a liquid silica gel molding process.

In an embodiment, the terminal device may further include:

a detecting component, connected to the rotation shaft and configured to detect a rotation angle of the rotation shaft and send the rotation angle of the rotation shaft to the processing component.

The processing component is connected with the detecting component, and is configured to determine the deformation state of the audio cavity component according to the rotation angle of the rotation shaft.

In the embodiments of the present disclosure, the detecting component is configured to detect the rotation angle of the rotation shaft.

For example, the detecting component includes, but not limited to, an angle sensor.

In the embodiments of the present disclosure, the audio cavity component generates the corresponding deformation state along with the rotation of the rotation shaft, so that the rotation angle of the rotation shaft can represent a deformation angle of the audio cavity component, and thus the current deformation state of the audio cavity component can be obtained.

It is to be noted that when the rotation shaft rotates by a first rotation angle, it is determined that the audio cavity component is in a first deformation state currently; when the rotation shaft rotates by a second rotation angle, it is determined that the audio cavity component is in a second deformation state currently; and when the rotation shaft rotates by a third rotation angle, it is determined that the audio cavity component is in a third deformation state currently.

In an embodiment, the processing component is further configured to: when the audio cavity component is in the first deformation state, obtain a first audio processing parameter which is prestored and corresponds to the first deformation state; when the audio cavity component is in the second deformation state, obtain a second audio processing parameter which is prestored and corresponds to the second deformation state; and when the audio cavity component is in the third deformation state, obtain a third audio processing parameter which is prestored and corresponds to the third deformation state.

It is to be noted that when the deformation states of the audio cavity component are different, the volumes of the audio cavity space of the audio cavity component are different, so the corresponding audio processing parameter may be set according to the volume of the audio cavity space.

It is understandable that the rotation angle of the rotation shaft may be obtained via the detecting component, the deformation state of the audio cavity component can be determined based on the rotation angle of the rotation shaft, and then the audio processing parameter corresponding to the deformation state of the audio cavity component can be obtained, so that the audio processing parameter can match the current deformation state of the audio cavity component to output a better audio effect.

In an embodiment, the processing component is further configured to process, according to the audio processing parameter, the audio signal to be output to obtain a processed audio signal.

The terminal device may further include:

an audio amplifying component, connected with the processing component and configured to perform amplification processing on the processed audio signal according to the audio processing parameter to obtain an amplified audio signal; and an audio output component, connected with the audio amplifying component and configured to output the amplified audio signal to the outside of the housing.

Figure 8:
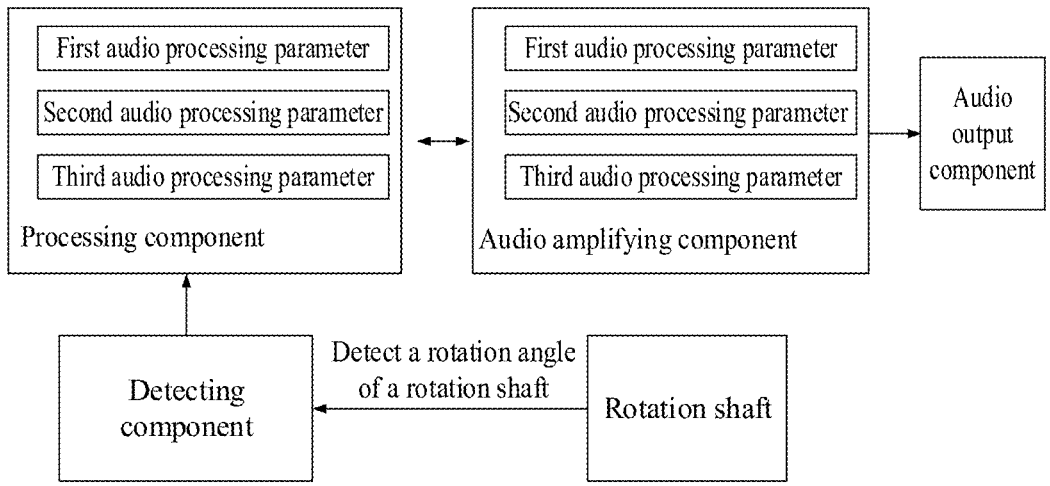
FIG. 8 is a schematic diagram illustrating audio processing in a terminal device, according to an example.

As shown in FIG. 8, the detecting component detects the rotation angle of the rotation shaft; the processing component determines the deformation state of the audio cavity component according to the rotation angle of the rotation shaft, and determines the audio processing parameter matching the deformation state of the audio cavity component based on the deformation state of the audio cavity component. The audio processing parameter may include the first audio processing parameter, the second audio processing parameter, and the third audio processing parameter. The processing component and the audio amplifying component can call the corresponding audio processing parameter to process the audio signals to be output in order, and output the audios via the audio output component.

It is to be noted that the audio amplifying component and the processing component may obtain the audio processing parameter matching the deformation state of the audio cavity component at a preset interval. The preset interval may be set according to actual needs, for example, the preset interval may be set to 12 seconds.

It is understandable that the audio amplifying component processes the audio signal according to the audio processing parameter matching the deformation state of the audio cavity component, so that the audio signal with a better effect can be further obtained.

Figure 9:
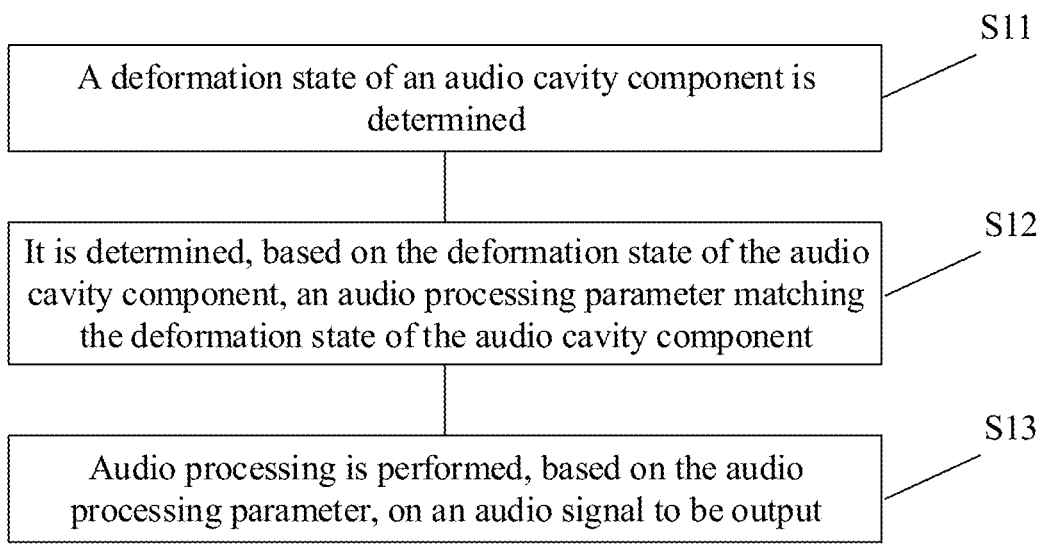
FIG. 9 is a flow chart showing a method for processing audio, according to an example.

FIG. 9 is a flow chart showing a method for processing audio, according to an example. As shown in FIG. 9, the method for processing audio signal may include the following operations.

In S11, a deformation state of an audio cavity component is determined. The deformation state of the audio cavity component is formed by a deformation of the audio cavity component along with a deformation of the housing at the flexible structure of the housing.

In S11, the audio cavity component of the terminal device is in the housing, and when the housing bends at the flexible structure, the audio cavity component deforms along with the deformation of the housing.

It is to be noted that the deformation state of the audio cavity component may be set according to a bending state.

For example, the deformation states of the audio cavity component include: the unbent state, the intermediate folding state and the complete folding state, which is not limited by the embodiments of the present disclosure.

In S12, it is determined, based on the deformation state of the audio cavity component, an audio processing parameter matching the deformation state of the audio cavity component.

In S12, when the audio cavity component is in different deformation states, the audio cavity spaces of the audio cavity component are different. The audio cavity space will impact an audio effect output by an audio cavity output component of the terminal device, so the terminal device needs to determine, based on the deformation state of the audio cavity component, the audio processing parameter matching the deformation state of the audio cavity component.

It is to be noted that in the embodiments of the present disclosure, there is a mapping relationship between the deformation state of the audio cavity component and an audio processing parameter, and the audio processing parameter matching the deformation state of the audio cavity component can be obtained based on the deformation state of the audio cavity component and the mapping relationship.

In S13, audio processing is performed on an audio signal to be output based on the audio processing parameter.

It is understandable that in consideration of the change of the audio cavity space of the audio cavity component during the bending in the embodiments of the present disclosure, the corresponding audio processing parameter can be determined based on the deformation state of the audio cavity component, so that the audio processing parameter can match the current deformation state of the audio cavity component, and thus a better audio effect can be output.

In an embodiment, the operation that the deformation state of the audio cavity component is determined may include that:

the rotation angle of the rotation shaft is obtained based on that the detecting component detects the rotation condition of the rotation shaft; and the deformation state of the audio cavity component is determined based on the rotation angle of the rotation shaft.

In the embodiments of the present disclosure, the terminal device can obtain, in the process of determining the deformation state of the audio cavity component, the rotation angle of the rotation shaft based on that the detecting component detects the rotation condition of the rotation shaft.

For example, the rotation angle of the rotation shaft may include that: 0 degree, 20 degrees, 90 degrees, and 180 degrees, which is not limited by the embodiments of the present disclosure.

It is to be noted that the audio cavity component generates the corresponding deformation state along with the rotation of the rotation shaft, so that the rotation angle of the rotation shaft can represent a deformation angle of the audio cavity component, and thus the current deformation state of the audio cavity component can be obtained.

In an embodiment, the operation that the deformation state of the audio cavity component is determined based on the rotation angle of the rotation shaft may include that:

when the rotation shaft rotates by the first rotation angle, it is determined that the audio cavity component is in the first deformation state;

when the rotation shaft rotates by the second rotation angle, it is determined that the audio cavity component is in the second deformation state; and when a rotation angle of the rotation shaft is between the first rotation angle and the second rotation angle, it is determined that the audio cavity component is in the third deformation state.

In the embodiments of the present disclosure, the different rotation angles of the rotation shaft correspond to different deformation states of the audio cavity component. The rotation angle of the rotation shaft is, but not limited to, between 0 degree and 180 degrees. The deformation states of the audio cavity component include, but not limited to, the unbent state, the intermediate folding state and the complete folding state. When the rotation angle of the rotation shaft is 0 degree, the first deformation state may be the unbent state; when the rotation angle of the rotation shaft is 180 degrees, the second deformation state may be the complete folding state; and when the rotation angle of the rotation shaft is between 0 degree and 180 degrees, the third deformation state may be the intermediate folding state.

For example, a mapping relationship between the rotation angle and the deformation state of the audio cavity component is built for the terminal device, as shown in Table 1.

TABLE 1

| Class | State | Rotation angle |
|---|---|---|
| The first deformation state | Unbent state | 0 degree |
| The second deformation state | Complete folding state | 180 degrees |
| The third deformation state | Intermediate folding state | 0 degree to 180 degrees |

In an embodiment, the operation that the audio processing parameter matching the deformation state of the audio cavity component is determined based on the deformation state of the audio cavity component may include that:

when the audio cavity component is in the first deformation state, the first audio processing parameter which is prestored and corresponds to the first deformation state is obtained;

when the audio cavity component is in the second deformation state, the second audio processing parameter which is prestored and corresponds to the second deformation state is obtained; and when the audio cavity component is in the third deformation state, the third audio processing parameter which is prestored and corresponds to the third deformation state is obtained.

In the embodiments of the present disclosure, a mapping relationship among the rotation angle, the deformation state of the audio cavity component and the audio processing parameter is built for the terminal device, as shown in Table 2.

TABLE 2

| Class | State | Rotation angle | Audio processing parameter |
|---|---|---|---|
| The first deformation state | Unbent state | 0 degree | The first audio processing parameter |
| The second deformation state | Complete folding state | 180 degrees | The second audio processing parameter |
| The third deformation state | Intermediate folding state | 0 degree to 180 degrees | The third audio processing parameter |

When the rotation angle of the rotation shaft is 0 degree, the first deformation state corresponds to the unbent state, and a corresponding call parameter is the first audio processing parameter corresponding to the first deformation state; when the rotation angle of the rotation shaft is 180 degrees, the second deformation state may be the complete folding state, and a corresponding call parameter is the second audio processing parameter corresponding to the second deformation state; and when the rotation angle of the rotation shaft is between 0 degree and 180 degrees, the third deformation state may be the intermediate folding state, and a corresponding call parameter is the third audio processing parameter corresponding to the third deformation state.

In an embodiment, the audio processing parameters include: at least one of the gain parameter or the filtering parameter. The operation that audio processing is performed, based on the audio processing parameter, on the audio signal to be output may include that:

when it is determined that the audio cavity component is in the first deformation state, at least one of gain processing or filtering processing is performed, based on the obtained first audio processing parameter, on the audio signal to be output, and then the processed audio signal is output;

when it is determined that the audio cavity component is in the second deformation state, at least one of the gain processing or the filtering processing is performed, based on the obtained second audio processing parameter, on the audio signal to be output, and then the processed audio signal is output; and when it is determined that the audio cavity component is in the third deformation state, at least one of the gain processing or the filtering processing is performed, based on the obtained third audio processing parameter, on the audio signal to be output, and then the processed audio signal is output.

It is understandable that in consideration of the change of the audio cavity space of the audio cavity component during the bending process in the embodiments of the present disclosure, the corresponding audio processing parameter can be determined based on the deformation state of the audio cavity component, so that the audio processing parameter can match the current deformation state of the audio cavity component, and thus a better audio effect can be output by processing the audio signal to be output based on the audio processing parameter.

Figure 10:
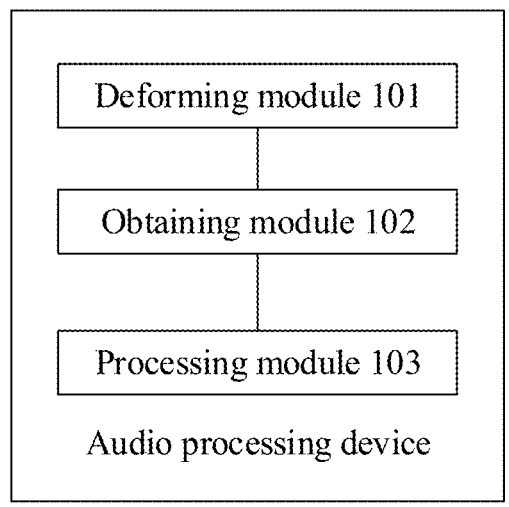
FIG. 10 is a structure diagram of a device for processing audio, according to an example.

FIG. 10 is a structure diagram of a device for processing audio, according to an example. As shown in FIG. 10, the device for processing audio may include: a deforming module 101, an obtaining module 102, and a processing module 103.

The deforming module 101 is configured to determine the deformation state of the audio cavity component. The deformation state of the audio cavity component is formed by a deformation of the audio cavity component along with a deformation of the housing at the flexible structure of the housing.

The obtaining module 102 is configured to determine, based on the deformation state of the audio cavity component, the audio processing parameter matching the deformation state of the audio cavity component.

The processing module 103 is configured to perform, based on the audio processing parameter, the audio processing on the audio signal to be output.

In an embodiment, the deforming module may include:
a first obtaining module, which is configured to obtain the rotation angle of the rotation shaft based on that the detecting component detects the rotation condition of the rotation shaft; and
a second obtaining module, which is configured to determine, based on the rotation angle of the rotation shaft, the deformation state of the audio cavity component.

In an embodiment, the second obtaining module is further configured to: when the rotation shaft rotates by the first rotation angle, determine that the first audio cavity of the audio cavity component is in the first deformation state; when the rotation shaft rotates by the second rotation angle, determine that the first audio cavity is in the second deformation state; and when a rotation angle of the rotation shaft is between the first rotation angle and the second rotation angle, determine that the audio cavity component is in the third deformation state.

In an embodiment, the obtaining module is further configured to: when the audio cavity component is in the first deformation state, obtain the first audio processing parameter which is prestored and corresponds to the first deformation state; when the audio cavity component is in the second deformation state, obtain the second audio processing parameter which is prestored and corresponds to the second deformation state; and when the audio cavity component is in the third deformation state, obtain the third audio processing parameter which is prestored and corresponds to the third deformation state.

In an embodiment, the processing module is further configured to:

when it is determined that the audio cavity component is in the first deformation state, perform, based on the obtained first audio processing parameter, at least of the gain processing or filtering processing on the audio signal to be output, and output the processed audio signal;

when it is determined that the audio cavity component is in the second deformation state, perform, based on the obtained second audio processing parameter, at least of the gain processing or the filtering processing on the audio signal to be output, and output the processed audio signal; and when it is determined that the audio cavity component is in the third deformation state, perform, based on the obtained third audio processing parameter, at least of the gain processing or the filtering processing on the audio signal to be output, and output the processed audio signal.

It is to be noted that "first", "second", and "third" in the embodiments of the present disclosure are only for the convenience of expression and distinction, and have no other special meaning.

With regard to the device in the above embodiments, the specific mode of each unit performing operations has been described in detail in the embodiments of the method, so it will not be repeated here.

Figure 11:
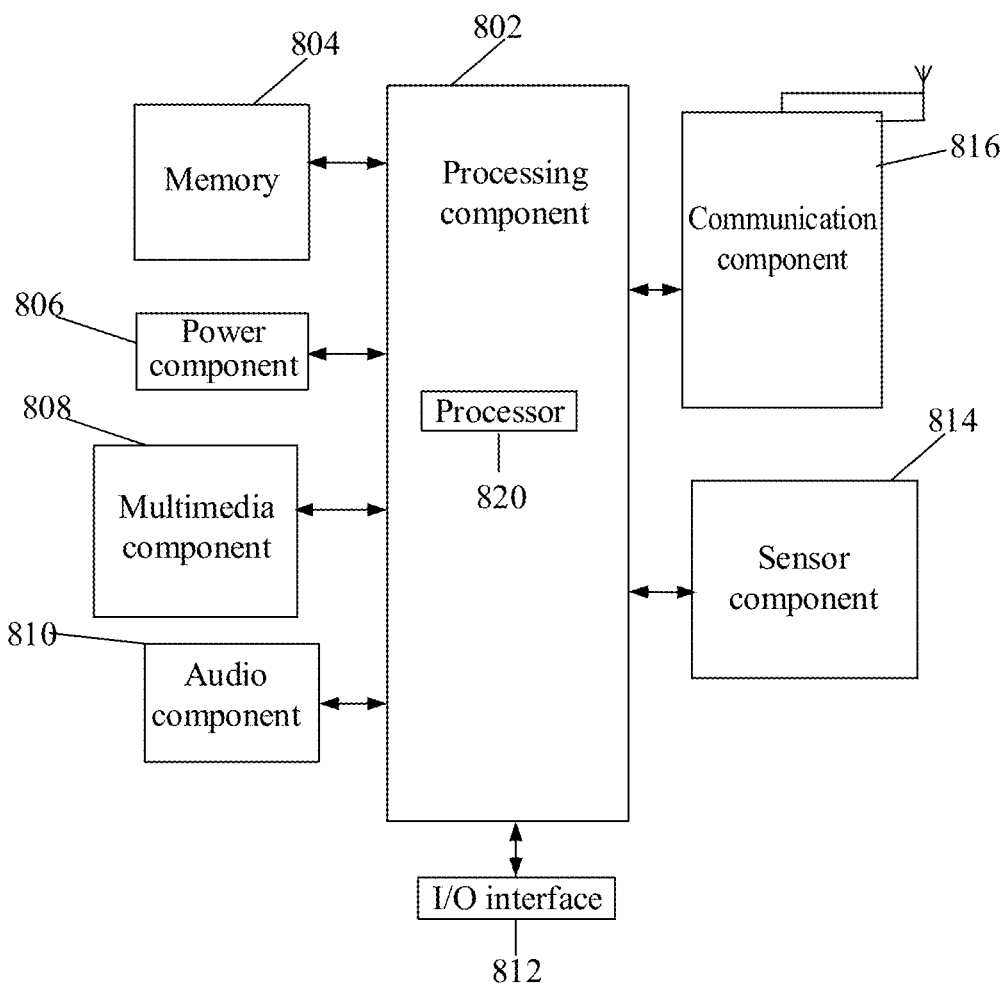
FIG. 11 is a structure block diagram of a terminal device, according to an example.

FIG. 11 is a structure block diagram of a terminal device, according to an example. For example, the terminal device 800 may be a mobile phone, a computer, a digital broadcast terminal, a messaging device, a gaming console, a tablet, a medical device, exercise equipment and a personal digital assistant.

Referring to FIG. 11, the terminal device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 may include one or more processors 820 to execute instructions to perform all or part of the steps in the above method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the terminal device 800. Examples of such data include instructions for any application programs or methods operated on the terminal device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the terminal device 800. The power component 806 may include a power management system, one or more power supplies, and other components associated with generation, management and distribution of power for the terminal device 800.

The multimedia component 808 includes a screen providing an output interface between the terminal device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the terminal device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the terminal device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the terminal device 800. For instance, the sensor component 814 may detect an on/off status of the terminal device 800 and relative positioning of components, such as a display and small keyboard of the terminal device 800, and the sensor component 814 may further detect a change in a position of the terminal device 800 or a component of the terminal device 800, presence or absence of contact between the user and the terminal device 800, orientation or acceleration/deceleration of the device terminal 800 and a change in temperature of the terminal device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the terminal device 800 and another device. The terminal device 800 may access a communication-standard-based wireless network, such as a Wireless Fidelity (WiFi) network, a 2nd-Generation (2G) or 3rd-Generation (3G) network or a combination thereof. In an example, the communication component 816 receives a broadcast signal or broadcast associated information from an external broadcast management system through a broadcast channel. In an example, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an example, the terminal device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method.

In an example, there is also provided anon-transitory computer-readable storage medium including an instruction, such as the memory 804 including an instruction, and the instruction may be executed by the processor 820 of the terminal device 800 to implement the abovementioned method. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

A non-transitory computer-readable storage medium is provided. When an instruction in the storage medium is executed by a processor of the terminal device, an electronic device can perform the audio processing method. The method includes that: based on that the audio cavity component deforms at the flexible structure of the housing along with the housing, the corresponding deformation state is formed; and the audio processing parameter matching the deformation state of the audio cavity component is determined based on the deformation state of the audio cavity component.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A terminal device, comprising:
    a housing having a flexible structure, wherein the housing is configured to bend at the flexible structure;
    an audio cavity component located within the housing, wherein the audio cavity component includes a deformation state corresponding to a deformation of the housing occurred at the flexible structure;
    a processing component configured to determine, based on the deformation state of the audio cavity component, an audio processing parameter corresponding to the deformation state of the audio cavity component; and
    a rotation shaft located within the housing, wherein the rotation shaft is configured to, when an external force is applied onto the rotation shaft via the housing, rotate and drive the housing to bend at the flexible structure,
    wherein the audio cavity component is configured to, when the housing bends, generate the deformation state corresponding to a rotation of the rotation shaft.

2. The terminal device of claim 1, wherein the audio cavity component comprises:
    a first audio cavity with a deformable structure, wherein the first audio cavity is arranged at the side of the rotation shaft facing the inside of the housing; and wherein when the rotation shaft rotates by a first rotation angle, the first audio cavity is in a first deformation state; when the rotation shaft rotates by a second rotation angle, the first audio cavity is in a second deformation state; and when a rotation angle of the rotation shaft is between the first rotation angle and the second rotation angle, the first audio cavity is in a third deformation state;
    a second audio cavity connected to the first audio cavity; and
    a third audio cavity connected to the first audio cavity;
    wherein when no deformation of the first audio cavity occurs, the second audio cavity and the third audio cavity are separately located at both sides of the first audio cavity.

3. The terminal device of claim 2, wherein the second audio cavity has a first opening, and the third audio cavity has a second opening; the first audio cavity is made of a flexible material and formed by an injection molding at a side of the first opening and at a side of the second opening, and an injection molded sealing is formed for the first opening and the second opening.

4. The terminal device of claim 1, further comprising:
    a detecting component connected to the rotation shaft, wherein the detecting component is configured to detect a rotation angle of the rotation shaft and send the rotation angle of the rotation shaft to the processing component;
    wherein the processing component is connected with the detecting component, and is configured to determine, according to the rotation angle of the rotation shaft, the deformation state of the audio cavity component.

5. The terminal device of claim 1, wherein the processing component is further configured to process, according to the audio processing parameter, an audio signal to be output to obtain a processed audio signal;
    the terminal device further comprises:
    an audio amplifying component connected with the processing component, wherein the audio amplifying component is configured to perform, according to the audio processing parameter, an amplification processing on the processed audio signal to obtain an amplified audio signal; and an audio output component connected with the audio amplifying component, wherein the audio output component is configured to output the amplified audio signal to the outside of the housing.

6. The terminal device of claim 1, wherein the deformation state of the audio cavity component comprises one of following states: an unbent state, an intermediate folding state, and a complete folding state.

7. The terminal device of claim 1, wherein the processing component determines the audio processing parameter corresponding to the deformation state of the audio cavity component according to a mapping relationship between deformation states and audio processing parameters.

8. An audio processing method performed by a terminal device, comprising:

determining a deformation state of an audio cavity component, wherein the deformation state of the audio cavity component is generated by the deformation of the audio cavity component corresponding to the deformation of a housing at a flexible structure of the housing, and wherein the terminal device comprises the housing having the flexible structure and configured to bend at the flexible structure, and the audio cavity component is located within the housing;

determining, based on the deformation state of the audio cavity component, an audio processing parameter corresponding to the deformation state of the audio cavity component; and performing, based on the audio processing parameter, audio processing on an audio signal to be output, wherein determining the deformation state of the audio cavity component comprises:

obtaining, based on a rotation of a rotation shaft, a rotation angle of the rotation shaft, wherein the rotation shaft is located within the housing, and the rotation shaft is configured to, when an external force is applied onto the rotation shaft via the housing, rotate and drive the housing to bend at the flexible structure; and determining, based on the rotation angle of the rotation shaft, the deformation state of the audio cavity component.

9. The method of claim 8, wherein determining, based on the rotation angle of the rotation shaft, the deformation state of the audio cavity component comprises:

when the rotation shaft rotates by a first rotation angle, determining that the audio cavity component is in a first deformation state;

when the rotation shaft rotates by a second rotation angle, determining that the audio cavity component is in a second deformation state; and when a rotation angle of the rotation shaft is between the first rotation angle and the second rotation angle, determining that the audio cavity component is in a third deformation state.

10. The method of claim 9, wherein determining, based on the deformation state of the audio cavity component, the audio processing parameter corresponding to the audio cavity component comprises:

when the audio cavity component is in the first deformation state, obtaining a first audio processing parameter which is prestored and corresponds to the first deformation state;

when the audio cavity component is in the second deformation state, obtaining a second audio processing parameter which is prestored and corresponds to the second deformation state; and when the audio cavity component is in the third deformation state, obtaining a third audio processing parameter which is prestored and corresponds to the third deformation state.

11. The method of claim 10, wherein the audio processing parameter comprises at least a gain parameter or a filtering parameter;

and wherein performing, based on the audio processing parameter, the audio processing on the audio signal to be output comprises:

when it is determined that the audio cavity component is in the first deformation state, performing, based on the obtained first audio processing parameter, at least one gain processing or filtering processing on the audio signal to be output, and outputting a processed audio signal;

when it is determined that the audio cavity component is in the second deformation state, performing, based on the obtained second audio processing parameter, at least one gain processing or filtering processing on the audio signal to be output, and outputting the processed audio signal; and when it is determined that the audio cavity component is in the third deformation state, performing, based on the obtained third audio processing parameter, at least one gain processing or filtering processing on the audio signal to be output, and outputting the processed audio signal.

12. The method of claim 8, wherein the deformation state of the audio cavity component comprises one of following states: an unbent state, an intermediate folding state, and a complete folding state.

13. The method of claim 8, wherein determining, based on the deformation state of the audio cavity component, the audio processing parameter corresponding to the deformation state of the audio cavity component comprises:

determining, the audio processing parameter corresponding to the deformation state of the audio cavity component according to a mapping relationship between deformation states audio processing parameters.

14. A non-transitory computer readable storage medium storing a plurality of programs for execution by a terminal device comprising one or more processors, wherein the plurality of programs, when executed by the one or more processors, cause the terminal device to perform acts comprising:

determining a deformation state of an audio cavity component, wherein the deformation state of the audio cavity component is generated by a deformation of the audio cavity component corresponding to a deformation of a housing at a flexible structure of the housing, and wherein the terminal device comprises the housing having the flexible structure and configured to bend at the flexible structure, and the audio cavity component is located within the housing;

determining, based on the deformation state of the audio cavity component, an audio processing parameter corresponding to the deformation state of the audio cavity component; and performing, based on the audio processing parameter, audio processing on an audio signal to be output, wherein determining the deformation state of the audio cavity component comprises:

obtaining, based on a rotation of a rotation shaft, a rotation angle of the rotation shaft, wherein the rotation shaft is located within the housing, and the rotation shaft is configured to, when an external force is applied onto the rotation shaft via the housing, rotate and drive the housing to bend at the flexible structure; and determining, based on the rotation angle of the rotation shaft, the deformation state of the audio cavity component.

15. The non-transitory computer readable storage medium of claim 14, wherein the terminal device is caused to perform acts further comprising:

when the rotation shaft rotates by a first rotation angle, determining that the audio cavity component is in a first deformation state;

when the rotation shaft rotates by a second rotation angle, determining that the audio cavity component is in a second deformation state; and when a rotation angle of the rotation shaft is between the first rotation angle and the second rotation angle, determining that the audio cavity component is in a third deformation state.

16. The non-transitory computer readable storage medium of claim 15, wherein the terminal device is caused to perform acts further comprising:

when the audio cavity component is in the first deformation state, obtaining a first audio processing parameter which is prestored and corresponds to the first deformation state;

when the audio cavity component is in the second deformation state, obtaining a second audio processing parameter which is prestored and corresponds to the second deformation state; and when the audio cavity component is in the third deformation state, obtaining a third audio processing parameter which is prestored and corresponds to the third deformation state.

17. The non-transitory computer readable storage medium of claim 15, wherein the terminal device is caused to perform acts further comprising:

when it is determined that the audio cavity component is in the first deformation state, perform, based on the obtained first audio processing parameter, at least one gain processing or filtering processing on the audio signal to be output, and output a processed audio signal;

when it is determined that the audio cavity component is in the second deformation state, perform, based on the obtained second audio processing parameter, at least one gain processing or filtering processing on the audio signal to be output, and output a processed audio signal;

when it is determined that the audio cavity component is in the third deformation state, perform, based on the obtained third audio processing parameter, at least one gain processing or filtering processing on the audio signal to be output, and output a processed audio signal.

* * * * *